US007012219B2

(12) United States Patent
Kim

(10) Patent No.: US 7,012,219 B2
(45) Date of Patent: Mar. 14, 2006

(54) COOKING APPARATUS AND METHOD OF CONTROLLING THE SAME

(75) Inventor: Hyang Ki Kim, Suwon-Si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/885,894

(22) Filed: Jul. 8, 2004

(65) Prior Publication Data

US 2005/0127060 A1 Jun. 16, 2005

(30) Foreign Application Priority Data

Dec. 10, 2003 (KR) ..................... 10-2003-0089777

(51) Int. Cl.
*A21B 1/26* (2006.01)
*A21B 2/00* (2006.01)

(52) U.S. Cl. ........................ 219/400; 219/681; 99/475; 126/21 A

(58) Field of Classification Search ................ 219/400, 219/681, 683; 99/475; 126/21 A
See application file for complete search history.

(56) References Cited

U.S. PATENT DOCUMENTS

| | | | | | |
|---|---|---|---|---|---|
| 2,452,016 | A | * | 10/1948 | Lyon et al. | 99/352 |
| 4,029,463 | A | * | 6/1977 | Johansson et al. | 432/25 |
| 4,189,995 | A | * | 2/1980 | Lohr et al. | 99/447 |
| 4,757,800 | A | * | 7/1988 | Shei et al. | 126/21 A |
| 5,601,070 | A | | 2/1997 | Hotard et al. | |
| 6,443,056 | B1 | * | 9/2002 | Kiefer et al. | 99/475 |
| 6,712,063 | B1 | * | 3/2004 | Thorneywork | 126/21 A |
| 2003/0000515 | A1 | * | 1/2003 | Cole et al. | 126/21 A |
| 2004/0040950 | A1 | * | 3/2004 | Carbone et al. | 219/400 |
| 2004/0211765 | A1 | * | 10/2004 | McFadden | 219/400 |

* cited by examiner

*Primary Examiner*—Joseph Pelham
(74) *Attorney, Agent, or Firm*—Staas & Halsey LLP

(57) ABSTRACT

A cooking apparatus and a method of controlling the cooking apparatus allow a temperature distribution of hot air to be uniform in a cooking cavity so that food in the cooking cavity is uniformly cooked, and enables initial heating of the air in the cooking cavity to be rapidly accomplished so that a cooking time is reduced. The cooking apparatus includes a cooking cavity, and first and second convection modules. The cooking cavity cooks food contained therein. The first convection module heats air in the cooking cavity and circulates the heated air. The second convection module is placed to be opposite to the first convection module so as to heat the air and circulate the heated air.

32 Claims, 7 Drawing Sheets

COOKING APPARATUS AND METHOD OF CONTROLLING THE SAME

CROSS-REFERENCE TO RELATED APPLICATIONS

This application claims the benefit of Korean Patent Application No. 2003-89777, filed Dec. 10, 2003 in the Korean Intellectual Property Office, the disclosure of which is incorporated herein by reference.

BACKGROUND OF THE INVENTION

1. Field of the Invention

The present invention relates, in general, to a cooking apparatus and, more particularly, to a cooking apparatus that includes a magnetron to generate microwaves and convection modules to supply hot air into a cooking cavity.

2. Description of the Related Art

A cooking apparatus disclosed in Japanese Unexamined Pat. Publication No. 8-247473 includes a body in which an inner casing forming a cooking cavity is placed inside an outer casing. An open front of the cooking cavity is selectively opened and closed by a door, and an air-blowing chamber is recessed behind the cooking cavity in the inner casing. A convection fan to compulsorily circulate air in the cooking cavity and a heater to heat the circulated air are placed in the air-blowing chamber. A cover is placed in front of the convection fan and the heater, that is, in front of the air-blowing chamber.

However, since the conventional cooking apparatus has a structure, in which hot air which is discharged through a hot air outlet formed at a back of the cooking cavity, is blown onto food placed on a food rack in the cooking cavity, and the hot air concentrically heats a specific portion of the food, so that the specific portion of the food is overcooked or burned, and a portion of the food opposite to the specific portion is left uncooked, thus the food is not uniformly cooked.

SUMMARY OF THE INVENTION

Accordingly, an aspect of the present invention provides a cooking apparatus that allows a temperature distribution of hot air to be uniform in a cooking cavity. As a result, food in the cooking cavity is uniformly cooked. The present invention also enables initial heating of air in the cooking cavity to be rapidly accomplished so that a cooking time is reduced.

Additional and/or other aspects and advantages of the invention will be set forth in part in the description which follows and, in part, will be obvious from the description, or may be learned by practice of the invention.

The above and/or other aspects are achieved by providing a cooking apparatus, including a cooking cavity, and first and second convection modules. The cooking cavity cooks food contained therein. The first convection module heats air in the cooking cavity and then circulates the heated air. The second convection module is placed opposite to the first convection module to heat the air in the cooking cavity and then circulate the heated air.

The above and/or other aspects are achieved by providing a cooking apparatus, including a cooking cavity, and first and second convection modules. The cooking cavity cooks food contained therein. The first convection module heats air in the cooking cavity and circulates the heated air. The second convection module is opposite to the first convection module and is vertically offset from the first convection module to heat the air and then circulate the heated air.

The above and/or other aspects are achieved by providing a cooking apparatus, including a cooking cavity, and first and second convection modules. The cooking cavity cooks food contained therein. The first convection module heats air in the cooking cavity and circulates the heated air. The second convection module is opposite to the first convection module and is horizontally offset from the first convection module so as to heat the air and then circulate the heated air.

The above and/or other aspects are achieved by providing a method of controlling a cooking apparatus, including heating air in a cooking cavity and circulating the heated air using first and second convection modules in a convection-cooking mode, and stopping the first and second convection modules if a predetermined first cooking time has elapsed.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
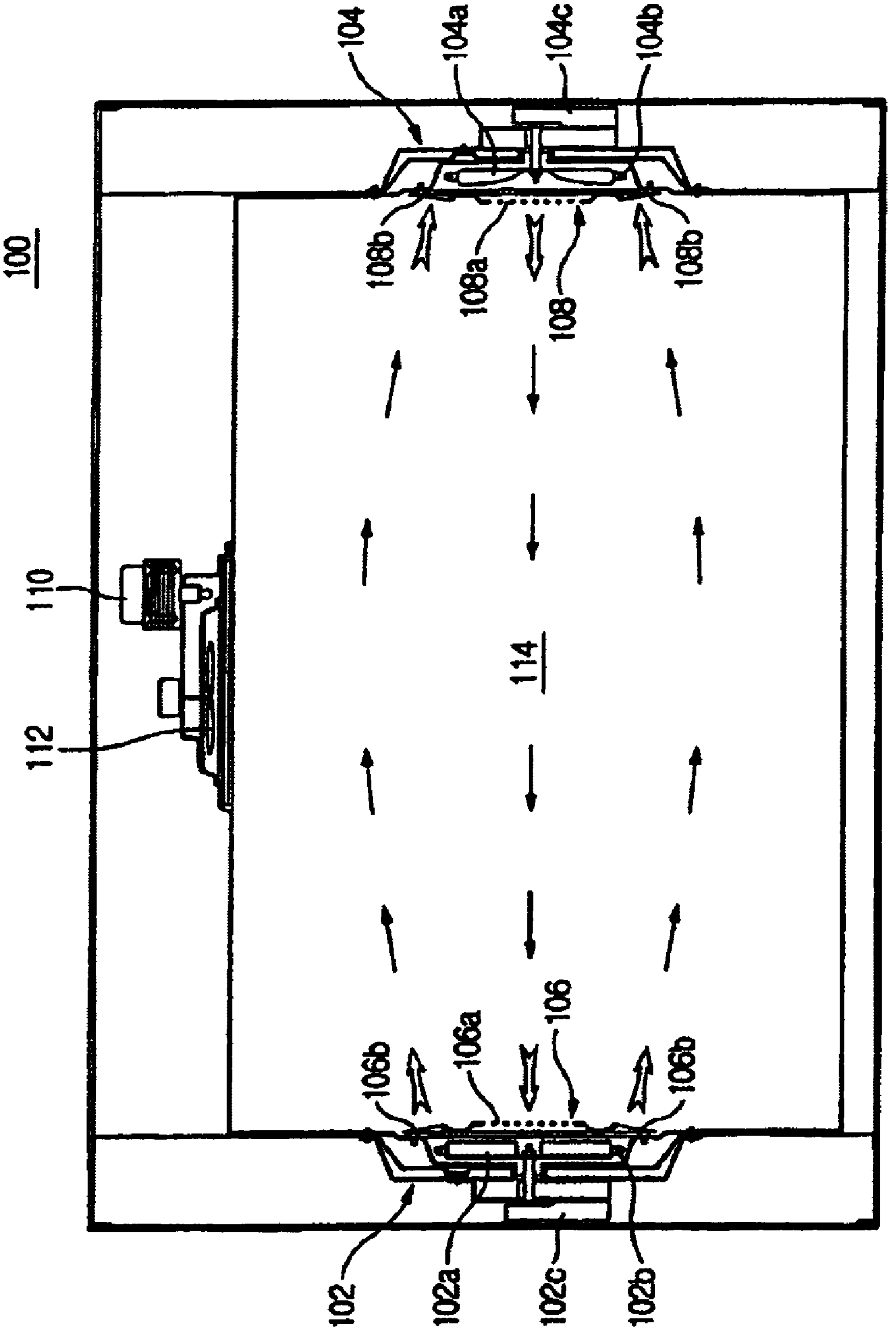
FIGS. 1 to 3 are views showing constructions of cooking apparatuses, according to embodiments of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
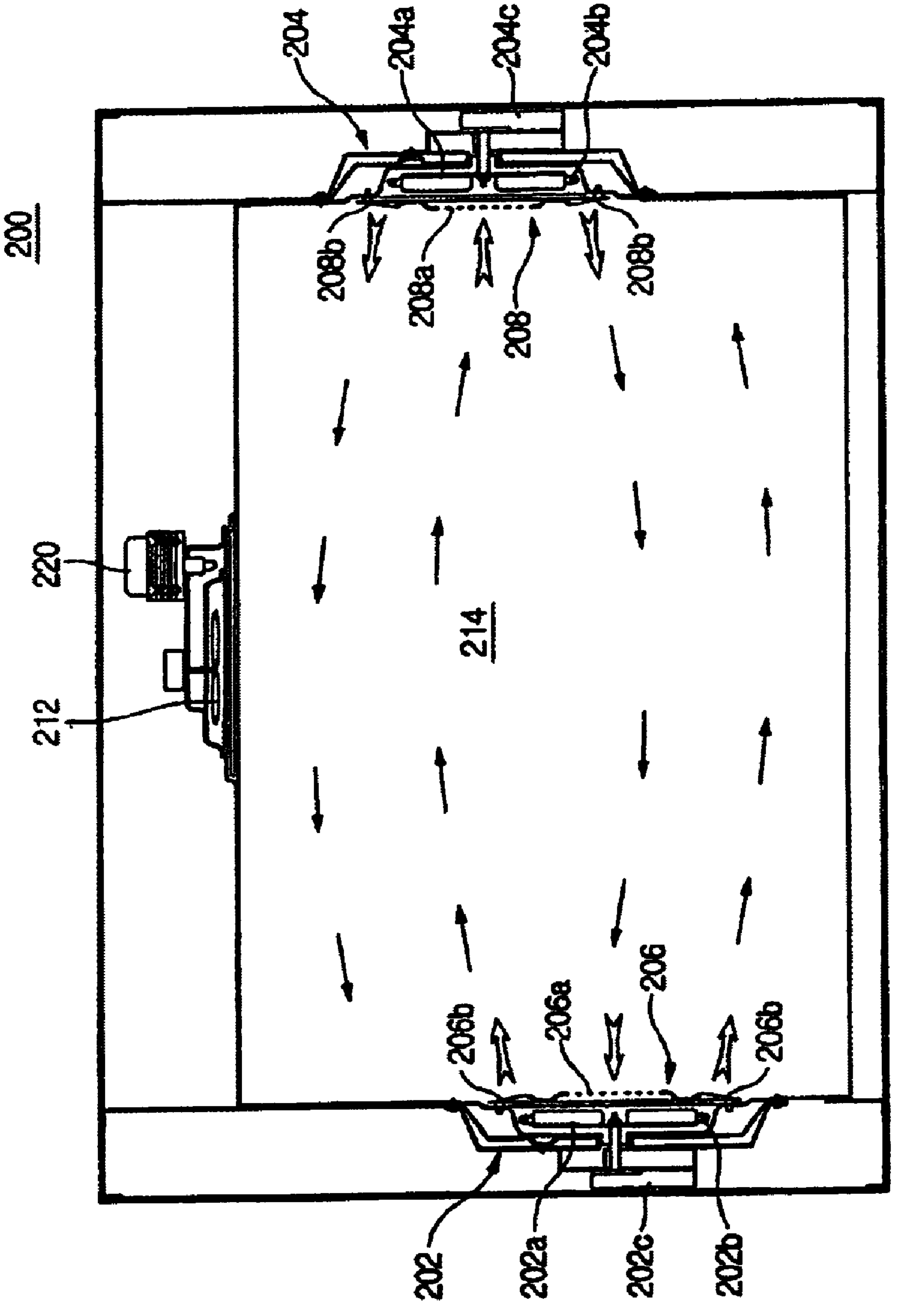
Figure 3:
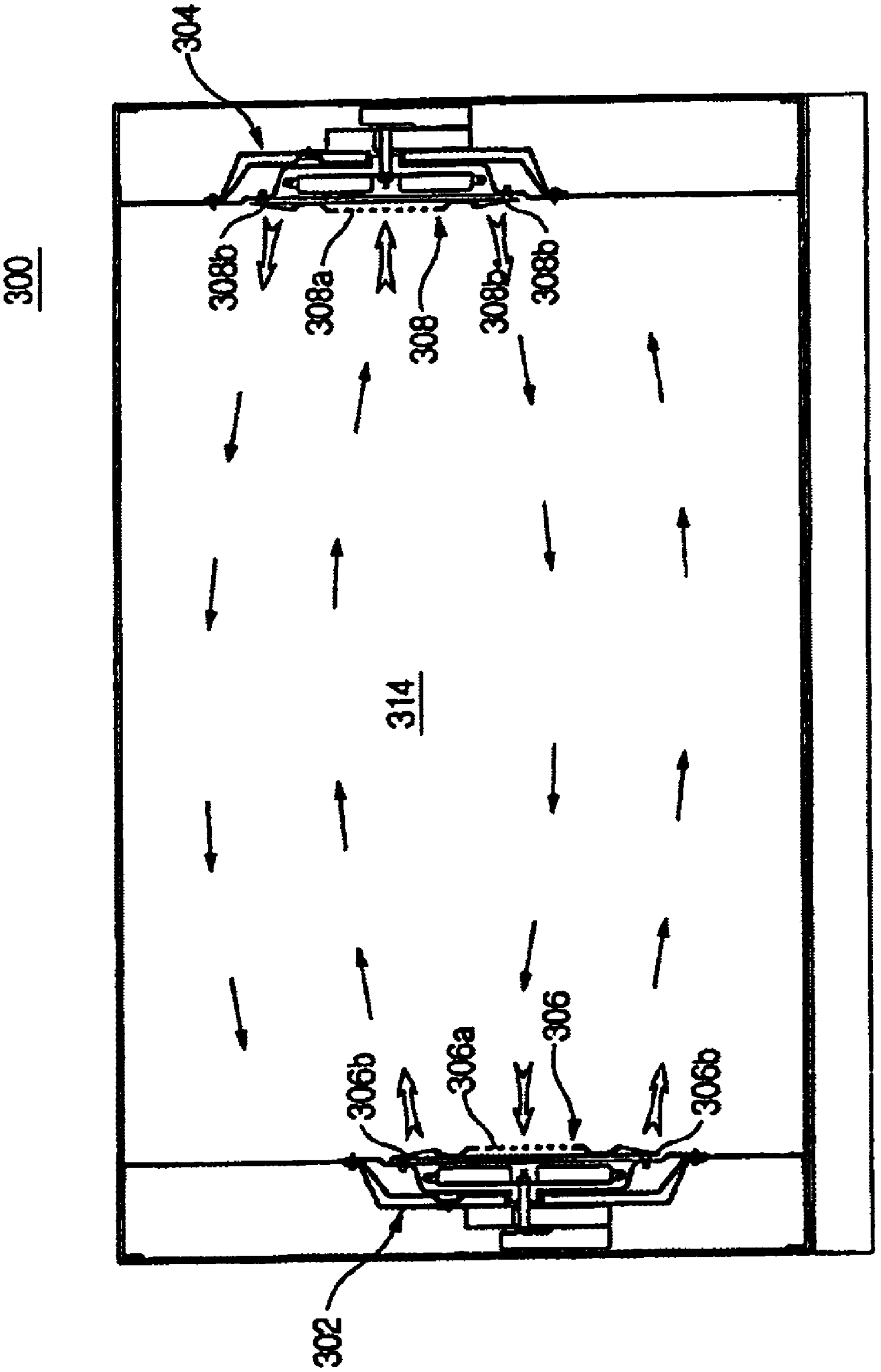

Cooking apparatuses and methods of controlling the cooking apparatuses according to embodiments of the present invention are described with reference to FIGS. 1 to 6 below. FIGS. 1 to 3 are cross sections showing constructions of convection microwave ovens according to embodiments of the present invention. FIG. 1 is a cross section showing a convection microwave oven 100 of the present invention, in which first and second convection modules 102 and 104 located on both sides of a cooking cavity 114, respectively, to be opposite to each other.

As shown in FIG. 1, the first convection module 102 includes a first convection fan 102*a*, a first fan motor 102*c* to operate the first convection fan 102*a*, and a first heater 102*b* to heat circulated air. The first convection fan 102*a* is a centrifugal fan, so that, when the first convection fan 102*a* rotates, air in the cooking cavity 114 is drawn through a center portion of the convection fan 102*a* and air heated by the first heater 102*b* is discharged through an outer portion of the convection fan 102*a*. A first cover member 106 is provided between the first convection module 102 and the cooking cavity 114. An air inlet 106*a* is formed along a center portion of the first cover member 106 to draw air from the cooking cavity 114, and a hot air outlet 106*b* is formed along an outer portion of the first cover member 106 to discharge hot air.

Accordingly, when the first convection module 102 is operated, air is drawn from the cooking cavity 114 to the center portion of the first convection fan 102*a*, heated by the first heater 102*b*, and then supplied back into the cooking cavity 114 through the outer portion of the first convection fan 102*a*. In other words convection of the hot air, in which the air is drawn into the center portion of the first cover member 106 and the hot air is discharged from the outer portion of the first cover member 106, as indicated by arrows in a left side of FIG. 1, is performed.

The second convection module 104 includes a second convection fan 104*a*, a second fan motor 104*c* to operate the second convection fan 104*a*, and a second heater 104*b* to heat circulated air. The second convection fan 104*a* is an axial-flow fan, so that, when the second convection fan 104*a* rotates, air in the cooking cavity 114 is drawn through an outer portion of the second convection fan 104*a*, and air heated by the heater 104*b* is discharged through a center portion of the second convection fan 104*a*. That is, the first and second convection fans 102*a* and 104*a* have opposite draw and discharge directions. A second cover member 108 is provided between the second convection module 104 and the cooking cavity 114. An air inlet 108*b* is formed along an outer portion of the second cover member 108 to draw the air from the cooking cavity 114, and a hot air outlet 108*a* is formed along a center portion of the second cover member 108 to discharge heated air.

Accordingly, when the second convection module 104 is operated, the air in the cooking cavity 114 is drawn through an outer portion of the second convection fan 104*a*, heated by the heater 104*b*, and then supplied back into the cooking cavity 114 through a center portion of the second convection fan 104*a*. Convection of the hot air, in which the air is drawn into the outer portion of the second cover member 108 and the hot air is discharged from the center portion of the second cover member 108, as indicated by arrows in a left side of FIG. 1, is performed.

If the first and second convection modules 102 and 104 are both operated, the first convection module 102 draws air from a center part of the cooking cavity 114, heats the air, and then discharges the heated air to front, back, upper, and lower parts of the cooking cavity 114. The second convection module 104 draws in the heated air, which was discharged into the outer parts of the cooking cavity 114, heats the drawn air again, and then discharges the heated air to the center part of the cooking cavity 114.

Similarly, heated air, which was discharged from the second convection module 104 into the center part of the cooking cavity 114, is drawn back into the first convection module by the first convection module 102. The redrawn air is reheated and then discharged. Supplementary draws and discharges of the first and second convection modules 102 and 104 allow the convection of the hot air to be effectively performed all through the cooking cavity 114, to distribute temperature uniformly throughout the cooking cavity 114. As a result, hot air with a uniform temperature distribution is applied to the entire food, thereby uniformly cooking the entire food.

FIG. 2 is a cross section showing a convection microwave oven 200, according to another embodiment of the present invention, which shows a cross section of the convection microwave oven 200 in which first and second convection modules 202 and 204 are provided on both sides of a cooking cavity 214 at, respectively, different heights. As shown in FIG. 2, the first convection module 202 includes a first convection fan 202*a*, a first fan motor 202*c* to operate the first convection fan 202*a* and a first heater 202*b* to heat circulated air. The first convection module 202 is provided on a lower part of a first side of the cooking cavity 214. The first convection fan 202*a* is a centrifugal fan, so that, when the first convection fan 202*a* rotates, a center portion of the first convection fan 202*a* draws air from the cooking cavity 214, and an outer portion of the cooking cavity 214 discharges air heated by the first heater 202*b*. A first cover member 206 is provided between the first convection module 202 and the cooking cavity 214. An air inlet 206*a* is formed in a center portion of the first cover member 206 to draw air, and a hot air outlet 206*b* is formed along an outer portion of the first cover member 206 to discharge the heated air.

Accordingly, when the first convection module 202 is operated, the air in the cooking cavity 214 is drawn through the center portion of the first convection fan 202*a*, heated by the first heater 202*b*, and then supplied back into the cooking cavity 214 through the outer portion of the first convection fan 202*a*. In other words, convection of the hot air in which the air is drawn into the center portion of the first cover member 206 and the hot air is discharged from the outer portion of the first cover member 206, as indicated by arrows in a left side of FIG. 2, is performed.

A second convection module 204 includes a second convection fan 204*b*, a second fan motor 204*c* to operate the second convection fan 204*a*, and a second heater 204*b* to heat circulated air. The second convection module 204 is provided on an upper part of a second side of the cooking cavity 214 to be opposite to the first convection module 202. The second convection module 204 is placed on the second side of the cooking cavity 214 at a height higher than that of the first convection module 202. The height of the second convection module 204 is such that a height of a lower part of the second hot air outlet 208*b* of a second cover member 208 is similar to that of the first air inlet 206*a* formed in a center portion of the first cover member 206. The second convection fan 204*a* is also a centrifugal fan, so that, when the second convection fan 204*a* rotates, air in the cooking cavity 214 is drawn through a center portion of the second convection fan 204*a*, and the air heated by the second heater 204 is discharged through an outer portion of the second convection fan 204*a*. That is, the first and second convection fans 202*a* and 204*a* have opposite draw and discharge directions. The second cover member 208 is provided between the second convection module 204 and the cooking cavity 214. An air inlet 208*a* is formed along a center portion of the second cover member 208 to draw air in the cooking cavity 214, and a hot air outlet 208*b* is formed along an outer portion of the second cover member 208 to discharge the heated air.

Accordingly, when the second convection module 204 is operated, the air in the cooking cavity 214 is drawn through the center portion of the second convection fan 204*a*, heated by the second heater 204*b*, and then directed back into the cooking cavity 214 through the outer portion of the second convection fan 204*a*. As a result, convection of the hot air, in which the air is drawn into the center portion of the second cover member 208 and the hot air is discharged from the outer portion of the second cover member 208, as indicated by arrows in a right side of FIG. 2, is performed.

If the first and second convection modules 202 and 204 are operated simultaneously, the first convection module 202 draws air from the cooking cavity 214, heats the air, and discharges the heated air into an upper half of the cooking cavity 214. As with the first convection module 202, the second convection module 204 draws air through the center portion of the second convection module 204 and discharges hot air through the outer portion of the second convection module 204 Therefore, the second convection module 204 draws air into the second convection module, heats the drawn air, and then discharges the heated air into a lower half of the cooking cavity 214. Although the first and second convection modules 202 and 204 draw and discharge air in opposite directions, a lower part of the second hot air outlet 208*b* of the second convection module 204 and the first air inlet 206*a* formed in the center portion of the second cover member 206 are located at equal heights. Thus, the second convection module 204 draws hot air, which was discharged back into the cooking cavity 214, through the first convection module 202, reheats the drawn air, and then discharges the heated air.

As described above, the first and second convection modules 202 and 204 are located at different heights, but the air inlets and hot air outlets of the first and second convection modules 202 and 204 are partially overlapped. Accordingly, convection of the hot air in the cooking cavity 214 is effectively performed, and a temperature distribution in the cooking cavity 214 is made uniform. As a result, hot air with a uniform temperature distribution is applied to the entire food in the cooking cavity 214, so that entire food is uniformly cooked.

FIG. 3 is a transverse section showing a convection microwave oven 300, according to still another embodiment of the present invention, in which first and second convection modules 302 and 304 are provided on both sides of a cooking cavity 314, respectively, at substantially similar heights. However, the first convection module 302 is provided on a front portion of a first side of the cooking cavity 314, and the second convection module 304 is provided on a back portion of a second side of the cooking cavity 314. That is, locations of an air inlet 306*a* and a hot air outlet 306*b* of the first convection module 302 are offset from locations of an air inlet 308*a* and a hot air outlet 308*b* of the second convection module 304. However, the air inlet and the hot air outlet 306*a* and 306*b* are partially overlapped, so that convection of the hot air in the cooking cavity 314 is effectively performed and a temperature distribution in the cooking cavity 314 is made uniform. As a result, the hot air with a uniform temperature distribution is applied to entire food in the cooking cavity 314 uniformly cook the entire food.

Figure 4:
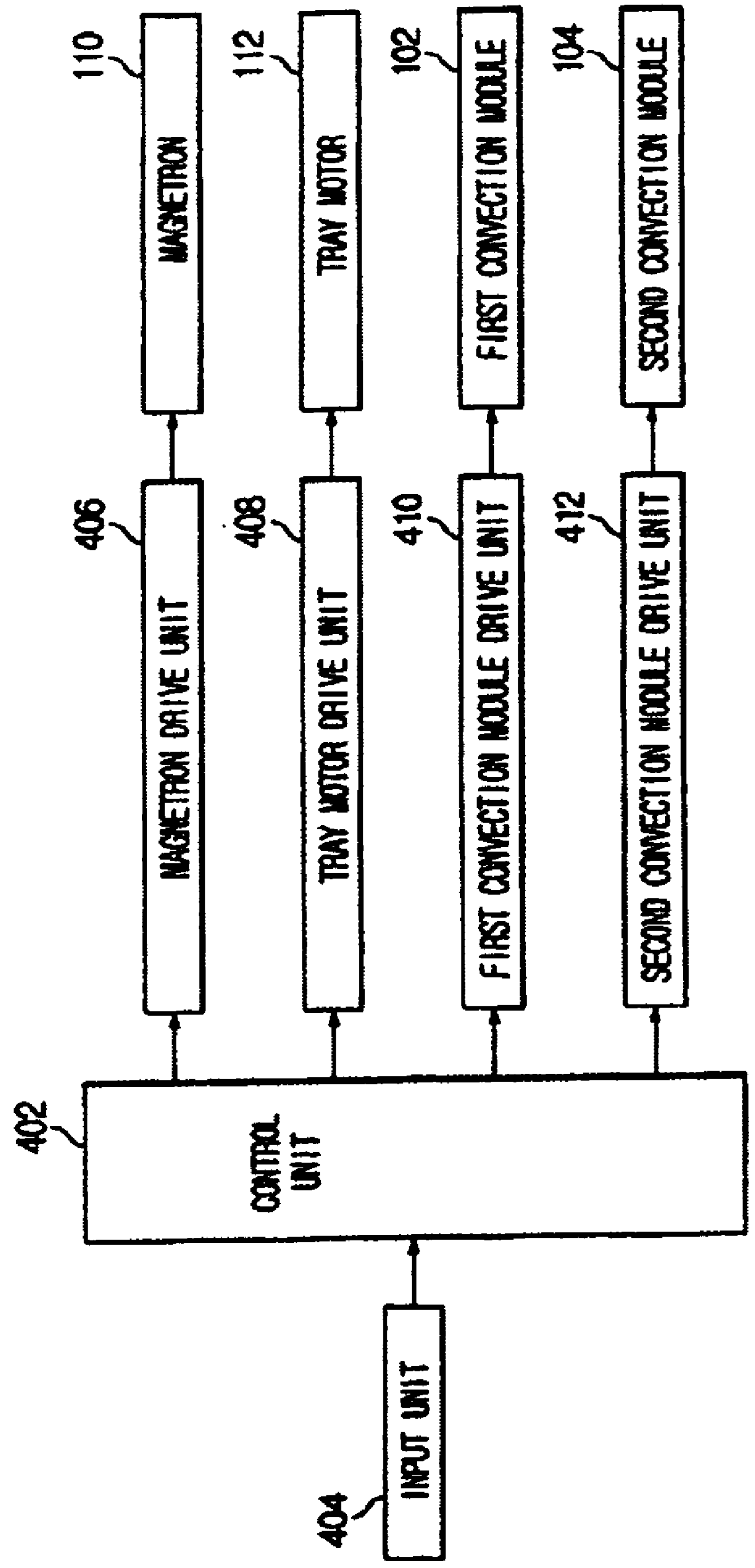
FIG. 4 is a block diagram showing a control system of a cooking apparatus of the present invention.

FIG. 4 is a block diagram showing a control system of a convection microwave oven 100, according to an embodiment of the present invention. As shown in FIG. 4, an input 404, to input a cooking mode or a set value for cooking, is connected to an input terminal of a controller to control an overall operation of the convection microwave oven 100. A magnetron driver 406, a tray motor driver 408, and first and second convection module drivers 410 and 412 are connected to an output terminal of the controller 402 to operate a magnetron 110, a tray motor 112, and first and second convection modules 102 and 104, respectively.

Figure 5:
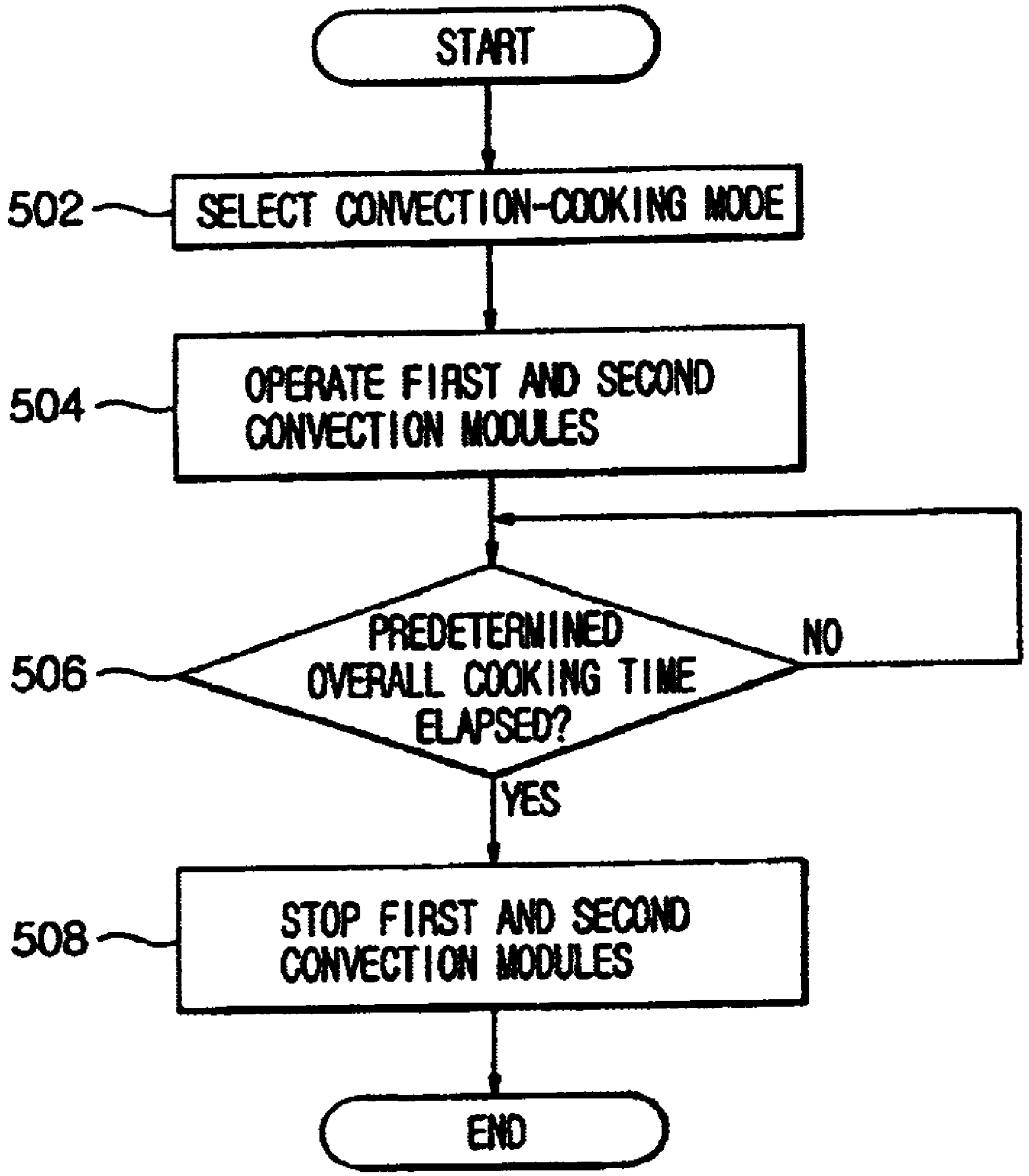
FIGS. 5 to 7 are flowcharts showing methods of controlling the cooking apparatus, according to embodiments of the present invention.
Figure 6:
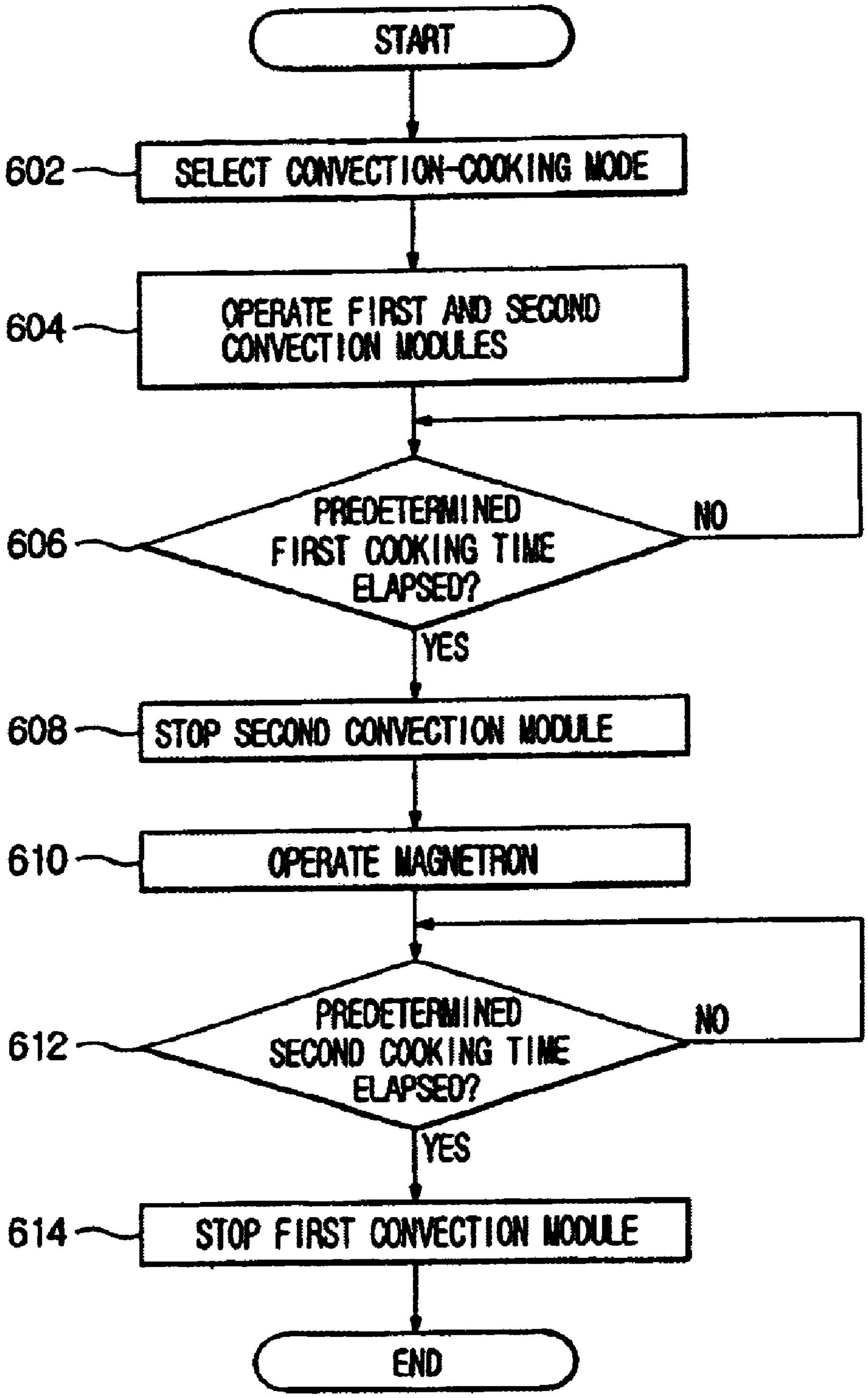
Figure 7:
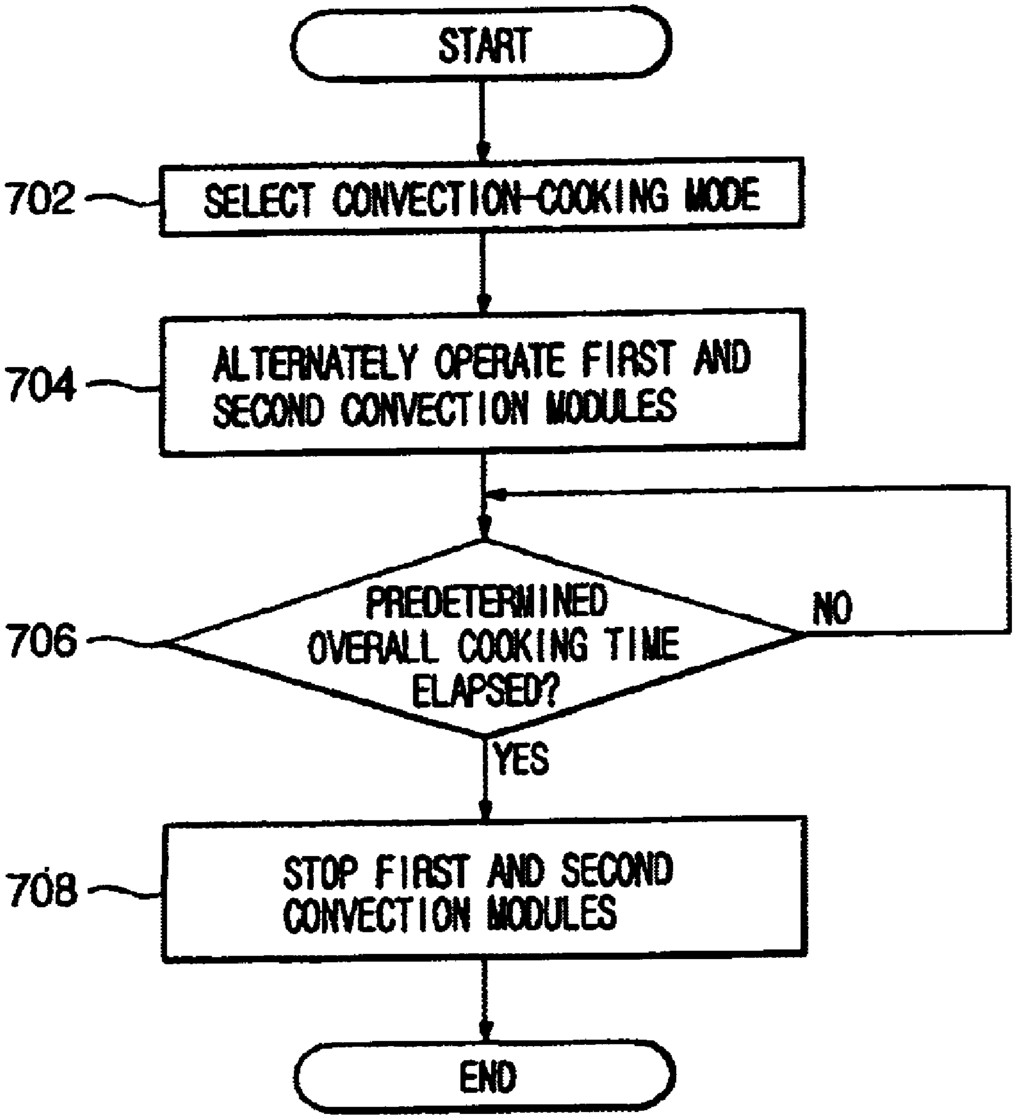

FIGS. 5 to 7 are flowcharts showing methods of controlling a cooking apparatus, according to embodiments of the present invention.

FIG. 5 is a flowchart showing a method of controlling a convection-cooking mode using only the first and second convection modules 102 and 104. As shown in FIG. 5, when a user selects the convection-cooking mode in operation 502, the first and second convection modules 102 and 104 are operated simultaneously in operation 504. Food is cooked by hot air generated by the first and second convection modules 102 and 104. If a predetermined cooking time has elapsed in operation 506, the first and second convection modules 102 and 104 are stopped. Thus, the convection-cooking mode ends in operation 508. Since the first and second convection modules 102 and 104 are operated simultaneously, a smooth convection of hot air is performed in the cooking cavity 114, and a temperature of the air is rapidly increased.

FIG. 6 is a flowchart showing a method of controlling a complex cooking mode using the first and second convection modules 102 and 104 and the magnetron 110. As shown in FIG. 6, when a convection-cooking mode is selected by a user in operation 602, the first and second convection modules 102 and 104 are all operated in operation 604. Food is cooked by hot air generated by the first and second convection modules 102 and 104. If a predetermined cooking time (that is, cooking time based on only convection) has elapsed in operation 606, one (for example, the second convection module 104) of the first and second convection modules 102 and 104 is stopped in operation 608. The magnetron 110 is operated while the first convection module 102 is continuously operated, so as to perform complex cooking using convection and microwaves in operation 610. If a predetermined second cooking time to perform the complex cooking has elapsed in operation 612, the first convection module 102 and the magnetron 110 are both stopped. Thus, the convection-cooking mode ends in operation 614.

FIG. 7 is a flowchart showing a method of controlling a cooking mode using the first and second convection modules 102 and 104, including alternately operating the first and second convection modules 102 and 104 rather than operating the first and second convection modules 102 and 104 simultaneously. As shown in FIG. 7, when a convection-cooking mode is selected by a user in operation 702, the first and second convection modules 102 and 104 are alternately operated in operation 704. That is, the first and second convection modules 102 and 104 are operated in an alternate manner. Food is cooked by hot air, which is generated by alternately operating the first and second convection modules 102 and 104. If a predetermined cooking time has elapsed in operation 706, the first and second convection modules 102 and 104 are both stopped, and thus the convection-cooking mode ends in operation 708. A heating speed of the air in the cooking cavity 114 may be controlled by alternately operating the first and second convection modules 102 and 104, as described above. Since the cooking apparatus of the present invention generates convection of hot air in a cooking cavity using two convection modules, a temperature distribution in the cooking cavity is uniformly maintained, so that the food may have a uniform cooking quality.

Furthermore, since the hot air is generated by using the two convection modules, a heating speed of air surrounding the food is improved, one or all of convection modules may be operated according to need, and the two convection modules may be alternately operated according to need, so that a temperature of the hot air may be controlled even though a heating temperature of a heater is fixed.

This invention may be understood to include alternate configurations of first and second modules which have not been explicitly discussed above. With regard to these additional configurations, the modules may be placed at various positions in the cooking cavity as long as a first module discharges air into a convenient area of the cooking cavity for a second module to draw the discharged air in. Similarly, the second module should be positioned so as to discharge air in an area of the cooking cavity that is convenient for the first module to draw the air, which the first module originally discharged, back in.

Furthermore, this invention may be understood to include additional modules beyond first and second modules. In such a case, additional modules would be in convenient draw and discharge positions relative to the first and second modules as well as with respect to any other additional modules.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cooking apparatus, comprising:

a cooking cavity to cook food contained therein;

a first convection module to heat air in the cooking cavity and to circulate the heated air; and a second convection module placed to be substantially opposite to the first convection module so as to heat the air in the cooking cavity and to circulate the heated air.

2. The cooking apparatus as set forth in claim 1, wherein:

the first convection module comprises a centrifugal fan to draw the air in the cooking cavity through a center portion thereof and to discharge the drawn air back into the cooking cavity through an outer portion thereof; and the second convection module comprises an axial-flow fan to draw the air in the cooking cavity through an outer portion thereof and to discharge the drawn air back into the cooking cavity through a center portion thereof.

3. The cooking apparatus as set forth in claim 2, further comprising a rotating shaft of the centrifugal fan of the first convection module and a rotating shaft of the axial-flow fan of the second convection module, wherein the rotating shafts are substantially aligned with each other.

4. A cooking apparatus, comprising:

a cooking cavity to cook food contained therein;

a first convection module to heat air in the cooking cavity and to circulate the heated air; and a second convection module opposite to and substantially vertically offset from the first convection module to heat the air and circulate the heated air.

5. The cooking apparatus as set forth in claim 4, wherein:

the first convection module comprises a first centrifugal fan to draw the air in the cooking cavity through a center portion thereof and to discharge the drawn air back into the cooking cavity through an outer portion thereof; and the second convection module comprises a second centrifugal fan to draw the air in the cooking cavity through an outer portion thereof and to discharge the drawn air back into the cooking cavity through a center portion thereof.

6. The cooking apparatus as set forth in claim 5, wherein a part of the outer portion of the first convection module and a part of the center portion of the second convection module are aligned with each other.

7. A cooking apparatus, comprising:

a cooking cavity to cook food contained therein;

a first convection module to heat air in the cooking cavity and to circulate the heated air; and a second convection module opposite to and substantially horizontally offset from the first convection module to heat the air and circulate the heated air.

8. The cooking apparatus as set forth in claim 7, wherein:

the first convection module comprises a first centrifugal fan to draw the air in the cooking cavity through a center portion thereof and to discharge the drawn air back into the cooking cavity through an outer portion thereof; and the second convection module comprises a second centrifugal fan to draw the air in the cooking cavity through a center portion thereof and to discharge the drawn air back into the cooking cavity through an outer portion thereof.

9. The cooking apparatus as set forth in claim 8, wherein a part of the outer portion of the first convection module and a part of the center portion of the second convection module are aligned with each other.

10. A method of controlling a cooking apparatus, the cooking apparatus having a cooking cavity to cook food contained therein, a first convection module to heat air in the cooking cavity and to circulate the heated air, and a second convection module placed to be opposite to the first convection module so as to heat the air in the cooking cavity and to circulate the heated air, comprising:

heating the air in the cooking cavity, circulating the heated air using the first and second convection modules in a convection-cooking mode; and stopping the first and second convection modules if a predetermined first cooking time has elapsed.

11. The method as set forth in claim 10, wherein the heating comprises continuously operating all the first and second convection modules.

12. The method as set forth in claim 10, wherein the heating comprises alternately operating the first and second convection modules.

13. The method as set forth in claim 10, further comprising cooking food using microwaves if the predetermined first cooking time has elapsed.

14. The method as set forth in claim 13, further comprising stopping one of the first and second convection modules during the cooking using microwaves.

15. A cooking apparatus, comprising:

a cooking cavity to cook food contained therein;

a first convection module provided at a first side of the cooking cavity to heat air in the cooking cavity and to circulate the heated air; and a second convection module provided at a second side of the cooking cavity to reheat the air, which is heated and circulated by the first convection module, and to recirculate the reheated air.

16. The cooking apparatus according to claim 15, wherein the first convection module comprises:

a first convection fan to circulate the air;

a first fan motor to operate the first convection fan; and a first heater to heat the air.

17. The cooking apparatus according to claim 16, wherein the first convection fan is a centrifugal fan to draw the air in the cooking cavity into the first convection module through a central portion of the first convection fan, and to discharge the heated air through an outer portion of the fan into the cooking cavity.

18. The cooking apparatus according to claim 15, further comprising a first cover member between the cooking cavity and the first convection module.

19. The cooking apparatus according to claim 18, further comprising:

an air inlet to draw the air into the first convection module from the cooking cavity; and an air outlet to discharge the air from the first convection module to the cooking cavity.

20. The cooking apparatus according to claim 15, wherein the second convection module comprises:

a second convection fan to circulate the air;

a second fan motor to operate the second convection fan; and a second heater to heat the air.

21. The cooking apparatus according to claim 20, wherein the second convection fan is an axial flow fan to draw the air in the cooking cavity into the second convection module through an outer portion of the convection fan, and to discharge the heated air through a central portion of the fan into the cooking cavity.

22. The cooking apparatus according to claim 15, further comprising a second cover member between the cooking cavity and the second convection module.

23. The cooking apparatus according to claim, 22, further comprising:

an air inlet to draw the air into the second convection module from the cooking cavity; and an air outlet to discharge the air from the second convection module to the cooking cavity.

24. The cooking apparatus according to claim 15, wherein the first and second convection modules continue to heat and re-circulate the air in the cooking cavity in supplementary draw and discharge processes.

25. The cooking apparatus according to claim 24, wherein the supplementary draw and discharge processes maintain a uniform temperature distribution of the air in the cooking cavity.

26. The cooking apparatus according to claim 15, wherein the first and second convection modules are vertically offset from each other.

27. The cooking apparatus according to claim 26, further comprising:

an air outlet of the second convection module to discharge the air into the cooking cavity; and an air inlet of the first convection module to draw the air into the first convection module from the cooking cavity, wherein part of the air outlet of the second convection module is aligned with a part of the air inlet of the first convection module.

28. The cooking apparatus according to claim 15, wherein the first and second convection modules are horizontally offset from each other.

29. The cooking apparatus according to claim 28, further comprising:

an air outlet of the second convection module to discharge the air into the cooking cavity; and an air inlet of the first convection module to draw the air into the first convection module from the cooking cavity, wherein a part of the air outlet of the second convection module is aligned with a part of the air inlet of the first convection module.

30. A method of heating a cooking cavity, of which a cooking mode having a predetermined cooking time has been selected, comprising:

drawing air from the cooking cavity into a first module provided at a first side of the cooking cavity;

heating and discharging the air into the cooking cavity;

drawing the heated air from the cooking cavity into a second module provided at a second side of the cooking cavity;

reheating and discharging the air into the cooking cavity;

subsequently drawing, heating, and discharging the air by the first and second modules; and stopping the subsequent drawing, heating, and discharging the air if the predetermined cooking time is elapsed.

31. The method according to claim 30, further comprising operating a magnetron to cooperate with one of the first and second modules.

32. The method according to claim 31, wherein the first and second modules are alternately operated.

* * * * *

UNITED STATES PATENT AND TRADEMARK OFFICE

CERTIFICATE OF CORRECTION

PATENT NO. : 7,012,219 B2
APPLICATION NO. : 10/885894
DATED : March 14, 2006
INVENTOR(S) : Hyang Ki Kim It is certified that error appears in the above-identified patent and that said Letters Patent is hereby corrected as shown below:

Column 9, line 22, Claim 23, replace “claim,” with --claim--, therfor;

Column 10, line 5, Claim 27, after “wherein” insert --a--.

Signed and Sealed this

Fifth Day of December, 2006

JON W. DUDAS
*Director of the United States Patent and Trademark Office*